(12) United States Patent
Yamazaki et al.

(10) Patent No.: US 6,453,782 B1
(45) Date of Patent: Sep. 24, 2002

(54) MACHINE TOOL

(75) Inventors: Tsunehiko Yamazaki; Naoe Fukumura, both of Nagoya; Masayoshi Mizukado, Kani; Kazuhiro Kikata, Gifu; Sadami Miyazaki, Konan; Koichi Maki, Nagoya, all of (JP)

(73) Assignee: Yamazaki Mazak Kabushiki Kaisha (JP)

( * ) Notice: Subject to any disclaimer, the term of this patent is extended or adjusted under 35 U.S.C. 154(b) by 14 days.

(21) Appl. No.: 09/651,972

(22) Filed: Aug. 31, 2000

(30) Foreign Application Priority Data

Jun. 23, 2000 (JP) ......................................... 2000-189375

(51) Int. Cl.[7] .............................. B23B 7/00; B23B 9/00
(52) U.S. Cl. .............................. 82/118; 82/121; 82/1.11; 700/159
(58) Field of Search .......................... 82/118, 120, 121, 82/129, 133, 134, 136, 1.11, 1.2, 1.3, 1.4, 1.5; 700/159, 167, 160

(56) References Cited

U.S. PATENT DOCUMENTS 4,683,626 A * 8/1987 Steiner ........................ 29/40
5,274,564 A * 12/1993 Sugita et al. .............. 82/118 X
5,447,467 A * 9/1995 Baltazar ..................... 451/364
5,910,199 A * 6/1999 Busick et al. ................ 82/1.11
6,155,148 A * 12/2000 Shinozaki et al. ........... 82/1.11

FOREIGN PATENT DOCUMENTS

DE        4236866 A1 * 5/1994    ................... 82/129

* cited by examiner

Primary Examiner—Henry Tsai
(74) Attorney, Agent, or Firm—Wolf, Block, Schorr and Solis-Cohen LLP; Richard P. Gilly

(57) ABSTRACT

A machine tool capable of performing screw-machining on a rotating workpiece has a tool rest which can attachably and detachably equip a turning tool with an insert on its tip and is provided so as to be freely driven to move in first and second axial directions orthogonal to each other. The tool rest is also being provided so as to freely rotate about a third axis orthogonal to the first and second axial directions so as to be positioned at a selected tool-rest angle with respect to the workpiece. The machine tool includes suitable features to allow inputting of machining information, computing of a cutting pattern, and execution of screw-machining.

3 Claims, 5 Drawing Sheets

FIG. 5

PAT 1

In the rough machining of the rill portion (①~⑧), frequency and number of steps is determined based on the shape of a tool and the shape of a screw.
number of steps = (height) / (cutting) counting fractions as one
depth of the step of No. m = (height) / (number of steps) Xm
frequency of the step No. m = [(pitch) - (ridge width) + [(height) - (depth of the step of No. m)] x sin [(angle) / 2] x 2 - (finishing stock) x 2] / (tool width)
frequency of the last step = [(pitch) - (ridge width) - (height) x sin [(angle) / 2]] / (tool width)
machining position of No. n of the step of No. m (computing the position of the left end of a tool with the center of the shape of a rill as a standard)
Zmn = -[(pitch) - (ridge width) + [(height) - (depth of the step of No. m)] x sin[(angle) / 2] x 2 - (finishing stock) x 2] / 2 + (tool width) X(n-1)
Xmn = (height) / 2 - (cutting) Xm
machining position of the last step
Zmn = - [(pitch) - (ridge width) - (height) x sin[(angle) / 2]] / 2 + (tool width) / 2
Xmn = - (height) / 2
machining position of the last corner portion (⑧)
Zmn = - [(pitch) - (ridge width) - (height) x sin [(angle) / 2]] / 2 - (tool width)
Xmn = - (height) / 2
rough machining of the first flank portion (⑨)
angle of the B axis = 90 - (angle) / 2
Zmn = [(pitch) - (ridge width) - (height) x sin [(angle) / 2]] / 2 - (tool width) Xcos[(angle) / 2] - (finishing stock)
Xmn = - (height) / 2 + (tool width) Xsin[(angle) / 2]
finishing of the first flank portion (⑩)
angle of the B axis = 90 - (angle) / 2
Zmn = [(pitch) - (ridge width) - (height) x sin [(angle) / 2]] / 2 - (tool width) Xcos [(angle) / 2]
Xmn = - (height) / 2 + (tool width) Xsin[(angle) / 2]
rough machining of the second flank portion (⑪)
angle of the B axis = 90 + (angle) / 2
Zmn = - [(pitch) - (ridge width) - (height) x sin[(angle) / 2]] / 2 + (finishing stock)
Xmn = - (height) / 2
finishing of the second flank portion (⑫)
angle of the B axis = 90 + (angle) / 2
Zmn = - [(pitch) - (ridge width) - (height) x sin[(angle) / 2] / 2
Xmn = - (height) / 2

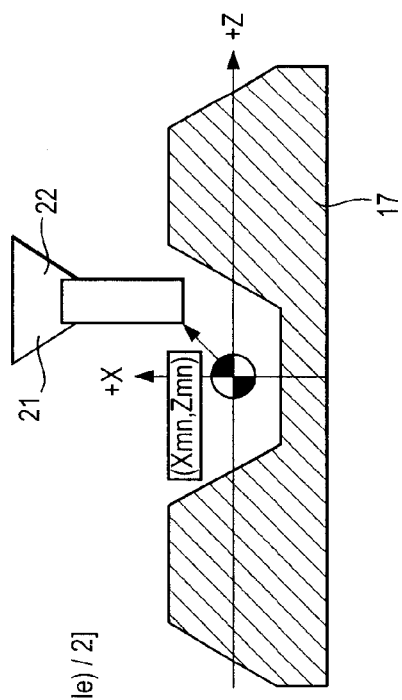

MACHINE TOOL

BACKGROUND OF THE INVENTION

This invention relates to a machine tool that can machine screws in which dimension and shape differ, even if exclusive screw-cutting tools fitting with the shape of screw thread are not used.

Until now, when cutting screws using lathes, etc., they do this machining using the exclusive lathe tools fitting with the shape of flank portions of a screw's ridge (rill) to be machined.

However, many kinds of tools are necessary, each of which fits with each inclination of flank portion of ridges to be machined, when such method is adopted. Therefore, the setup of these tools takes time as well, as the number of tools is occupied for the screw-machining and the number of tools used for other machining is limited. There was such inconvenience.

This invention is based on in the superscription circumstance, and its purpose is to offer the machine tool, which can machine screws with flank portions of various inclinations by one tool.

SUMMARY OF THE INVENTION

In order to solve the above-mentioned problems, the invention mentioned in claim 1 is a machine tool, which has a tool rest that can attachably and detachably equip a turning tool with an insert on its tip, said tool rest is provided so as to be freely driven to move in the first and second axial direction (X, Z axial direction) orthogonalizing for each other, and said tool rest is also provided so as to freely rotate with the third axis (B axis) as a center orthogonalizing for said first and second axial direction and to be positioned at each angle, and which can do screw-machining on a rotating workpiece by said turning tool, comprising:

input means for inputting machining information in the screw-machining;

cutting pattern computing portion, which computes a cutting pattern, in which said screw-machining is executed so as to rotate said turning tool with said third axis as a center and position it, based on the machining information input by said input means; and screw-machining executing portion executing said screw-machining on said workpiece based on the cutting pattern computed by said cutting pattern computing portion.

The invention of claim 1 so executes the screw-machining based on the cutting pattern in which the turning tool is rotated with the third axis as a center and positioned. So it is possible to machine screws with flank portions of various inclination by a single tool, without machining flank portions of ridges by the tools, as the convention, fitting with the inclination of the each flank portion.

The invention mentioned in claim 2 is characterized as said cutting pattern computing portion computes said cutting pattern in such a manner that the first flank and the second flank of a ridge are machined by the separate process.

The invention of claim 2 machines the first flank and the second flank of a ridge by the separate process. So it is possible to form the different inclination on the first flank and the second flank easily and to easily machine a screw of complicated shape as a saw blade screw.

The invention mentioned in claim 3 is characterized as said cutting pattern computing portion computes said cutting pattern in such a manner that said turning tool is inverted in machining the first flank and the second flank of said ridge.

The invention of claim 3 makes it possible to machine screws of more various shapes, if the turning tool is inverted when machining the first flank and the second flank of the ridge.

The invention mentioned in claim 4 is characterized as said cutting pattern computing portion computes said cutting pattern in such a manner that finish machining for the first flank and the second flank of a ridge are done by the separate process.

The invention of claim 4 makes the high-precise machining of a ridge, if finishing the first flank and the second flank of a ridge by the separate process.

BRIEF DESCRIPTION OF THE DRAWINGS

FIG. 5 is a view showing an example of computing of cutting pattern.

DESCRIPTION OF THE PREFERRED EMBODIMENT

Figure 1:
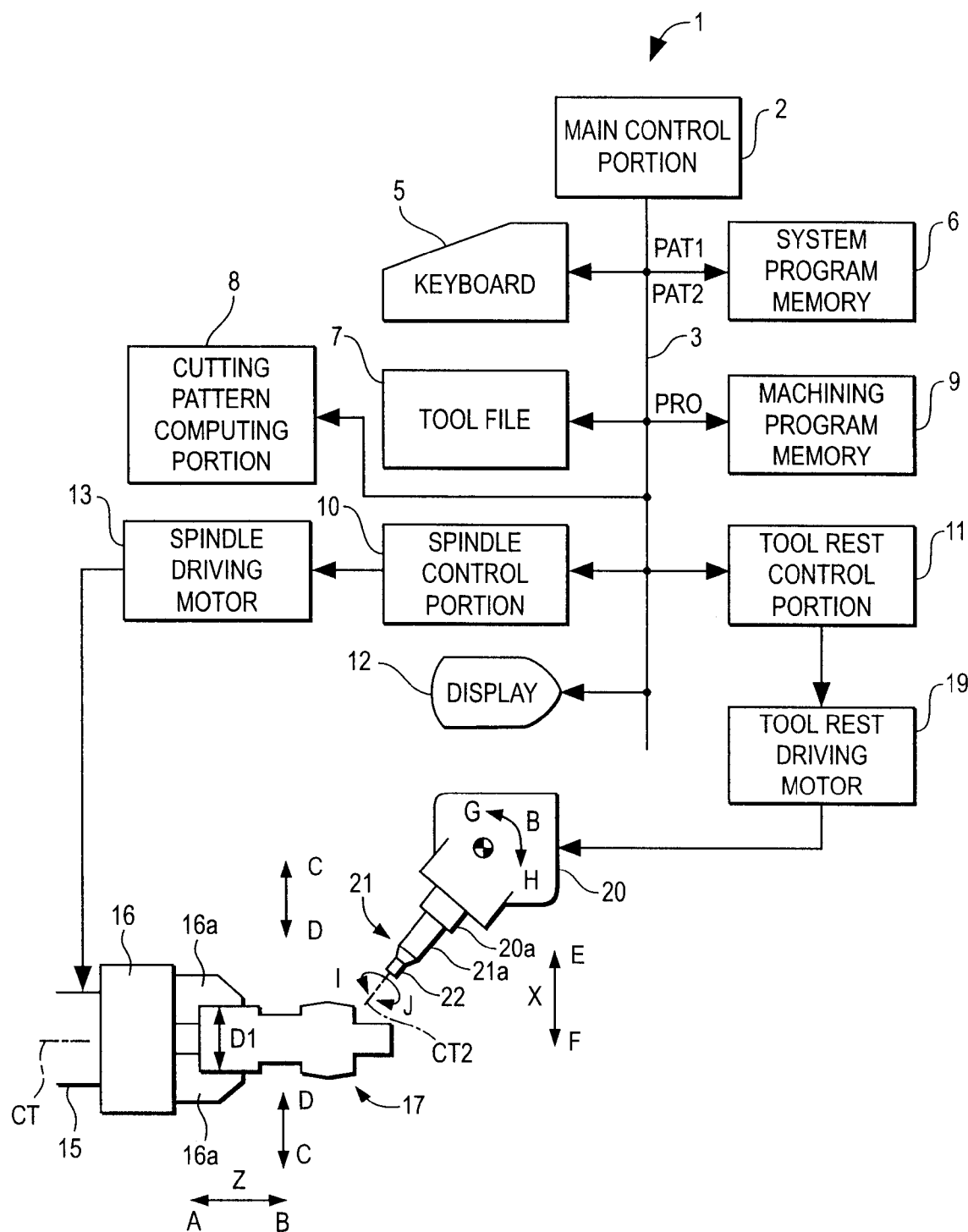
FIG. 1 is a control block diagram showing an example of a screw-machining apparatus to which the present invention is applied.

A complex machining machine tool 1 has a main control portion 2, as shown in FIG. 1. Such an input portion as a keyboard 5, a system program memory 6, a tool file 7, a cutting pattern computing portion 8, a machining program memory 9, a spindle control portion 10, a tool rest control portion 11 and a display 12 are connected with the main control portion 2 via bus lines 3. A spindle motor 13 is connected with the spindle control portion 10. A spindle 15 is connected with the spindle motor 13. The spindle 15 is so provided to be freely driven to rotate with the axial center CT, parallel to the Z axis, as a center and be positioned. And a chuck 16 is provided with the spindle 15. Claws 16a are provided with the chuck 16, which can hold or release a workpiece 17 to be machined and be driven to move in the direction as shown by the arrows C and D.

And, tool rest driving motors 19 (plural number) are connected with the tool rest control portion 11. A tool rest 20 is so connected to the tool rest driving motors 19 that the tool rest 20 can be driven to move in the direction of the Z axis (the direction as shown by the arrows A and B) and in the direction as shown by the arrows E and F which is the right angle direction with the Z axis, that is, in the direction of the X axis direction by the tool rest driving motor 19. Furthermore, the tool rest 20 is so provided as to be freely driven to move by the tool rest driving motor 19 in the Y axis direction which is the right angle direction with paper, having right angle with the X axis and the Z axis, and in the direction as shown by the arrows G and H which is the B axis direction with the Y axis as a center.

A tool holding portion 20a is formed on the tool rest 20. A turning tool 21 is provided with the tool holding portion 20a, being attachable to it, detachable from it and freely exchanged. The tool holding portion 20a is so provided as to freely fix and hold a tool in a predetermined holding state and to be freely driven to rotate in the direction as shown by the arrows I and J, which is the direction around the axial center CT2, and be positioned.

Figure 3:
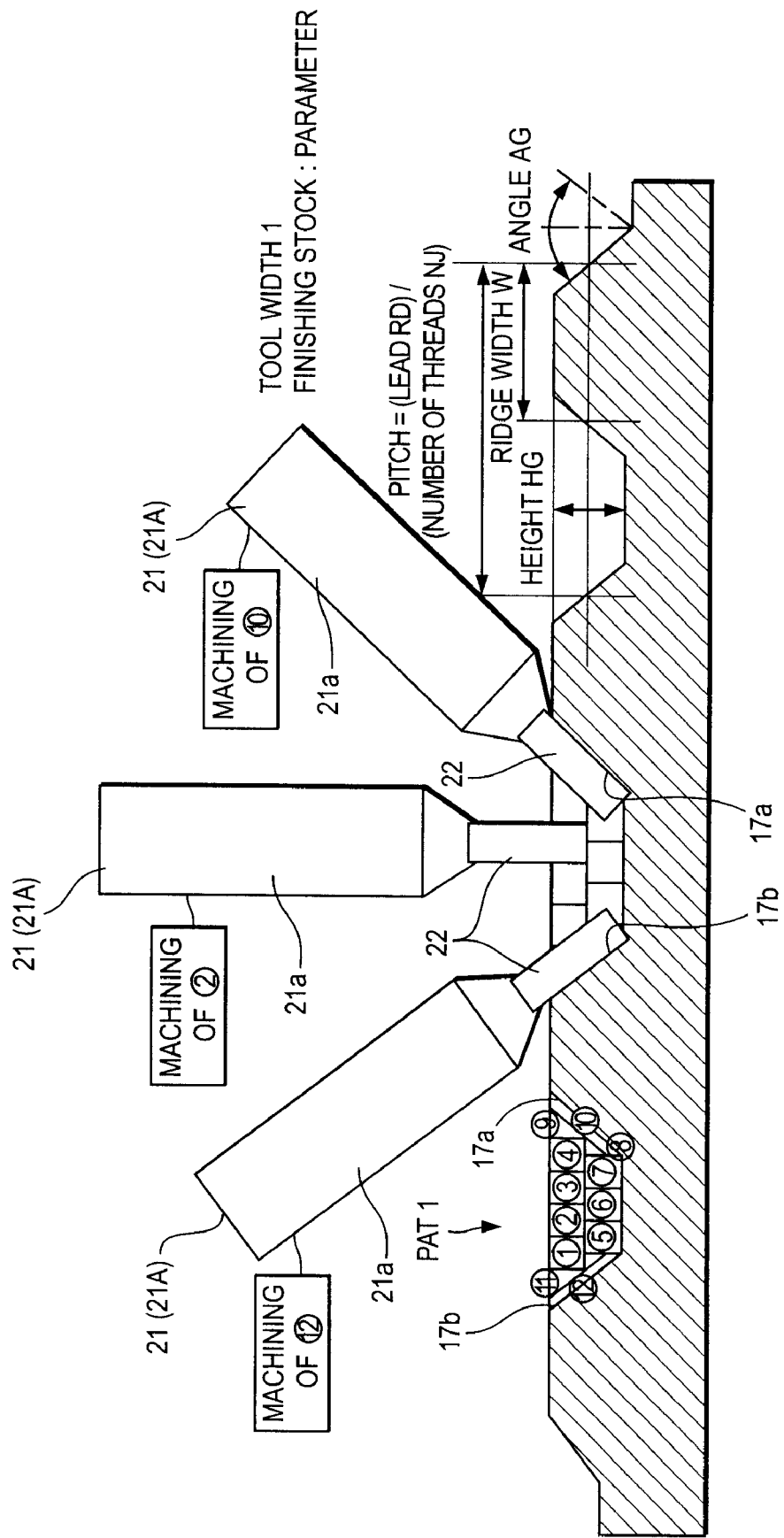
FIG. 3 is a view showing an example of screw-cutting with a rectangular tool.
Figure 4B:
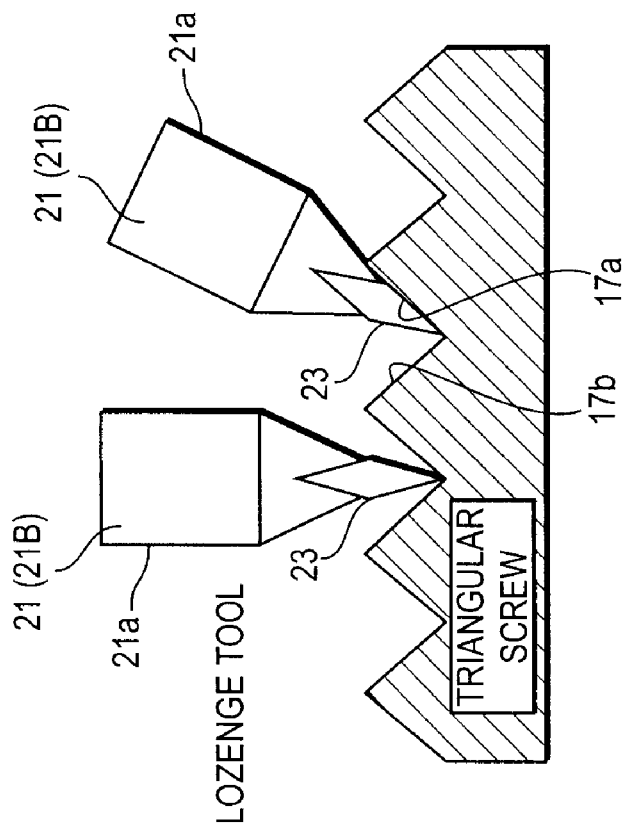
FIG. 4 is a view showing an example of screw-cutting with a lozenge tool.

A rectangular byte for screw cutting 21A among a plurality of turning tools 21 to be installed on the tool rest 20 has a main body 21a formed in the shape of round bar, as shown in FIG. 3. A rectangular insert 22, which has a rectangular view as seen on a plane, is installed on the tip of the main body 21a. And, a lozenge cutting tool for screw cutting 21B among the plurality of tools 21 to be installed on the tool rest 20 has a main body 21a formed in the shape of round bar, as shown in FIG. 4. A lozenge insert 23, which has a lozenge view as seen on a plane, is installed on the tip of the main body 21a.

Figure 2:
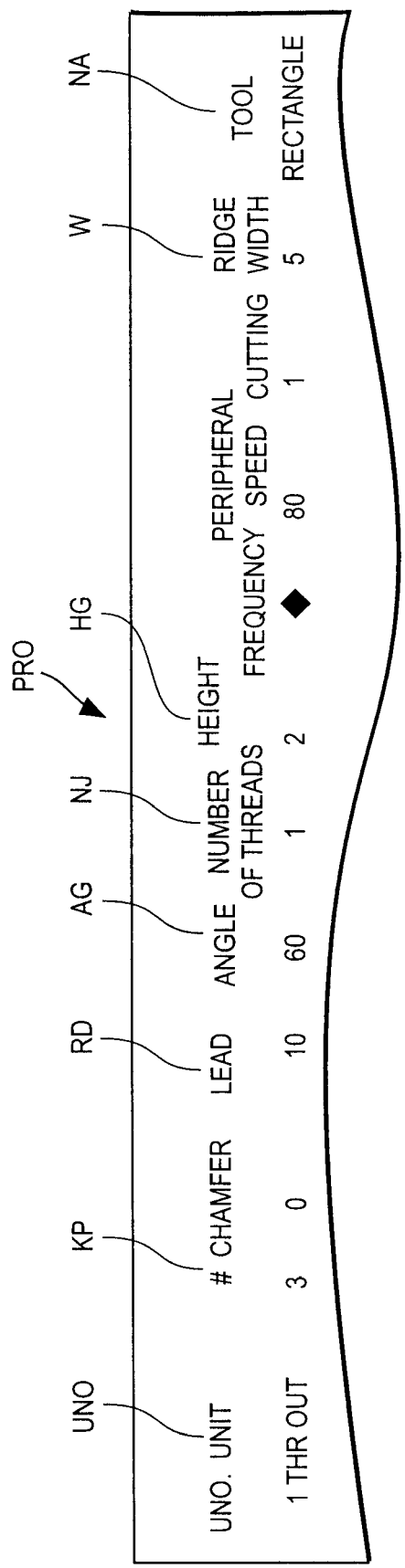
FIG. 2 is a view showing an example of screw-cutting program.

The complex machining machine tool 1 has the above-mentioned structure. Then, in order to form a screw having optional shape, such as a trapezium, a triangle and so on, on the workpiece 17 with the complex machining machine tool 1, an operator firstly inputs various kinds of machining information necessary for the screw-machining by operating the keyboard 5. The main control portion 2 reads out a known automatic program composing program from the system program memory 6 when the machining information is input to compose the machining program PRO for the screw-machining on the basis of the automatic program composing program. For example, the information is input into the machining program PRO, as is shown in FIG. 2. At the digit of the unit name UNO, "THR OUT" which means screw-machining is input. At the digit of cutting pattern KP which indicates the cutting pattern of the screw, number "3" which means the arbitrary shape is input. In addition, the operator continues to input various machining information necessary for the machining by manipulating keyboards 5. This machining information includes next items concerning the screw. These are, Lead RD shown in FIG. 3(In FIG. 2, "10" which means 10 millimeters is input in lead RD.), angle AG (In FIG. 2, "60" which means 60° C. is input in angle AG.), number of threads NJ (In FIG. 2, "1" which means the 1-thread screw is input.), height HG (In FIG. 2, "2" which means 2 millimeters is input in height HG.), ridge width W (In FIG. 2, "5" which means 5 millimeters is input in ridge width W.), and tool name NA (This is "rectangle" which expresses the rectangle tool in FIG. 2.) used for the machining, which is also input.

When the machining information necessary for the machining is input and the machining program PRO is composed in this way, the composed machining program PRO is stored in the machining program memory 9.

When the machining program PRO concerning the screw-machining is composed in this way, an operator instructs the main control portion 2 to perform the screw-machining on the workpiece 17 through the keyboard 5. Receiving this, the main control portion 2 reads out the machining program PRO of the screw-machining concerning the workpiece 17 from the machining program memory 9 so as to perform the screw-machining, appropriately driving the spindle control portion 10 and the tool rest control portion 11.

On this occasion, the main control portion 2 has the cutting pattern computing portion 8 to compute the detailed cutting pattern. That is, the cutting pattern computing portion 8 judges the screw's shape to be machined from tool name NA in the machining program PRO. The screw's shape to be machined is judged being trapezoidal screw or square screw, when tool name NA is "rectangle", otherwise the screw's shape is judged being a triangular screw in case of "lozenge".

Suppose the tool name NA should be "rectangle" and the screw's shape to be machined should be judged being a trapezoidal screw or a square screw. In this case, the cutting pattern computing portion 8 reads out the cutting pattern PAT1 for a square screw stored in the system program memory 6 and computes and decides the concrete machining process based on the read cutting pattern PAT1.

The cutting pattern PAT1 for a square screw is divided into next processes as is shown in FIG. 3. These are, a) rough machining of the rill portion of the screw shown by circled numbers from 1 to 8 in the figure, b) rough machining of the flank portion 17a of the screw at the right side in the figure, shown by circled 9 in the figure, that is, rough machining in the first flank portion, c) finishing of the flank portion 17a of the screw at the right side in the figure, shown by circled 10 in the figure, that is, finishing in the first flank portion, d) rough machining of the flank portion 17b of the screw at the left side in the figure, shown by circled 11 in the figure, that is, rough machining in the second flank portion which faces the first flank portion, e) finishing of the flank portion 17b of the screw at the left side in the figure, shown by circled 12 in the figure, That is, finishing in the second flank portion. The detailed cutting data in each machining process is computed immediately from the input machining information, as is shown in FIG. 5.

Figure 4A:
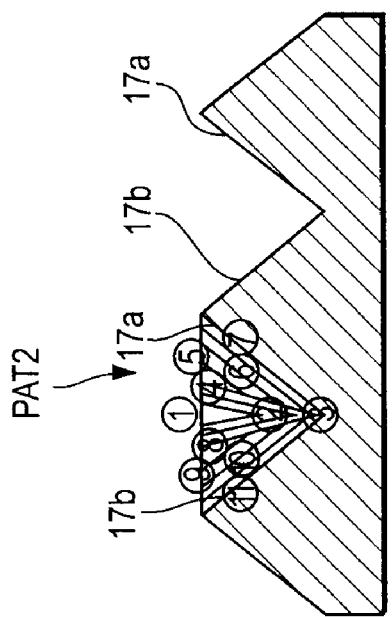

However cutting pattern PAT2 for the triangular screw is read out from the system program memory 6, when tool name NA is "lozenge". This cutting pattern PAT2 is shown in FIG. 4(a). That is, a) rough machining of the rill portion of the screw shown by circled numbers from 1 to 3 in the figure, b) rough machining of the flank portion 17a of the screw at the right side in the figure, shown by circled numbers from 4 to 6 in the figure, that is, rough machining in the first flank portion, c) finishing of the flank portion 17a of the screw at the right side in the figure, shown by circled 7 in the figure, that is, finishing in the first flank portion, d) rough machining of the flank portion 17b of the screw at the left side in the figure, shown by circled numbers from 8 to 10 in the figure, that is, rough machining in the second flank portion which faces the first flank portion, e) finishing of the flank portion 17b of the screw at the left side in the figure, shown by circled 11 in the figure, that is, finishing in the second flank portion. Also the cutting pattern computing portion 8 similarly computes the cutting pattern PAT2 based on the machining information input when composing the machining program PRO.

In this way, the main control portion 2 lets the spindle control portion 10 and the spindle driving motor 13 rotate the workpiece around the axial center CT based on the computed cutting patterns PAT1 and PAT2, as well as it lets the tool rest control portion 11 and the tool rest driving motors 19 drive the tool rest to move in arrow A, B direction and arrow E, F direction, each of which is the X, Z axial direction. By this, the machining of the predetermined screw-cutting on the workpiece 17 by the bytes 21A and 21B is executed in the every process following the order indicated by circled numbers.

In either case of the cutting patterns PAT1 and PAT2, what is characteristic is that the screw ridge is machined such that the bytes 21A and 21B are rotated in the arrow G, H direction, which is the B axial direction, to be positioned, as shown in FIG. 3 and FIG. 4. Based on angle AG of the ridge of the machining program PRO, the cutting pattern computing portion 8 computes and decides this degree of the B axial angle, for example, as is shown by rough/finishing machining process (circled numbers from 9 to 12) of the first and the second flank portion in FIG. 5.

That is to say, in rough machining and finishing in the flank portion, the bytes 21A and 21B carry out the machining such that these bytes are rotated in the arrow G, H direction, which is the B axial direction, and positioned. By this, it is possible to machine the flank portions 17a and 17b of the ridge at the optional angle, and to easily machine various screw ridges such as trapezoidal screws, square screws and triangular screws by tools of the little numbers such as a rectangular byte 21A and a lozenge byte 21B, even if the exclusive tools formed with the shape of a ridge is not used.

Still, it is also possible to do as following in the machining of a screw ridge. The cutting tools 21A and 21B are rotated with the axial center CT2 of the tool holding portion 20a as a center in arrow I, J direction, which is the A axial direction, and positioned. In machining the first flank portion 17a and the second flank portion 17b, each of which is on the left or right of the screw ridge, the cutting patterns PAT1 and PAT2 are decided such as inverting tools. Based on this, the cutting tools 21A and 21B are used.

The present invention is explained on the basis of the embodiments heretofore. The embodiments, which are described in the present specification, are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. A machine tool capable of performing screw-machining on a rotating workpiece, comprising:

a tool rest that can attachably and detachably equip a turning tool with an insert on its tip, said tool rest being provided so as to be freely driven to move in first and second axial directions orthogonal to each other, and said tool rest also being provided so as to freely rotate about a third axis orthogonal to said first and second axial directions so as to be positioned at a selected tool-rest angle with respect to the workpiece;

input means for inputting machining information corresponding to screw-machining a screw having flank portions comprised of a first flank portion and a second flank portion facing said first flank portion, and a ridge having an angle;

a cutting pattern computing portion, which computes a cutting pattern, in which said screw-machining includes rotating said turning tool about the third axis and positioning said turning tool, based on the angle of a ridge shown in the machining information input by said input means;

said cutting pattern having different machining processes for performing respective machining concerning said first flank portion and said second flank portion of said screw to be machined on the basis of the angle of said ridge, said machining processes including changing the tool-rest angle without changing the insert; and a screw-machining executing portion executing said screw-machining on said workpiece, said machining processes concerning said first flank portion and said second flank portion performed in an order based on the cutting pattern computed by said cutting pattern computing portion.

2. The machine tool as set forth in claim 1, wherein said cutting pattern computing portion computes said cutting pattern in such a manner that said turning tool is inverted in machining the first flank and the second flank of said ridge.

3. The machine tool as set forth in claim 1, wherein said cutting pattern computing portion computes said cutting pattern in such a manner that finish machining for the first flank and the second flank of a ridge are done by a separate process.

* * * * *